Dec. 12, 1933.     J. W. GREENLEAF     1,938,627
METHOD OF AND APPARATUS FOR MAKING INSULATED WIRE
Filed Dec. 13, 1929     4 Sheets-Sheet 1
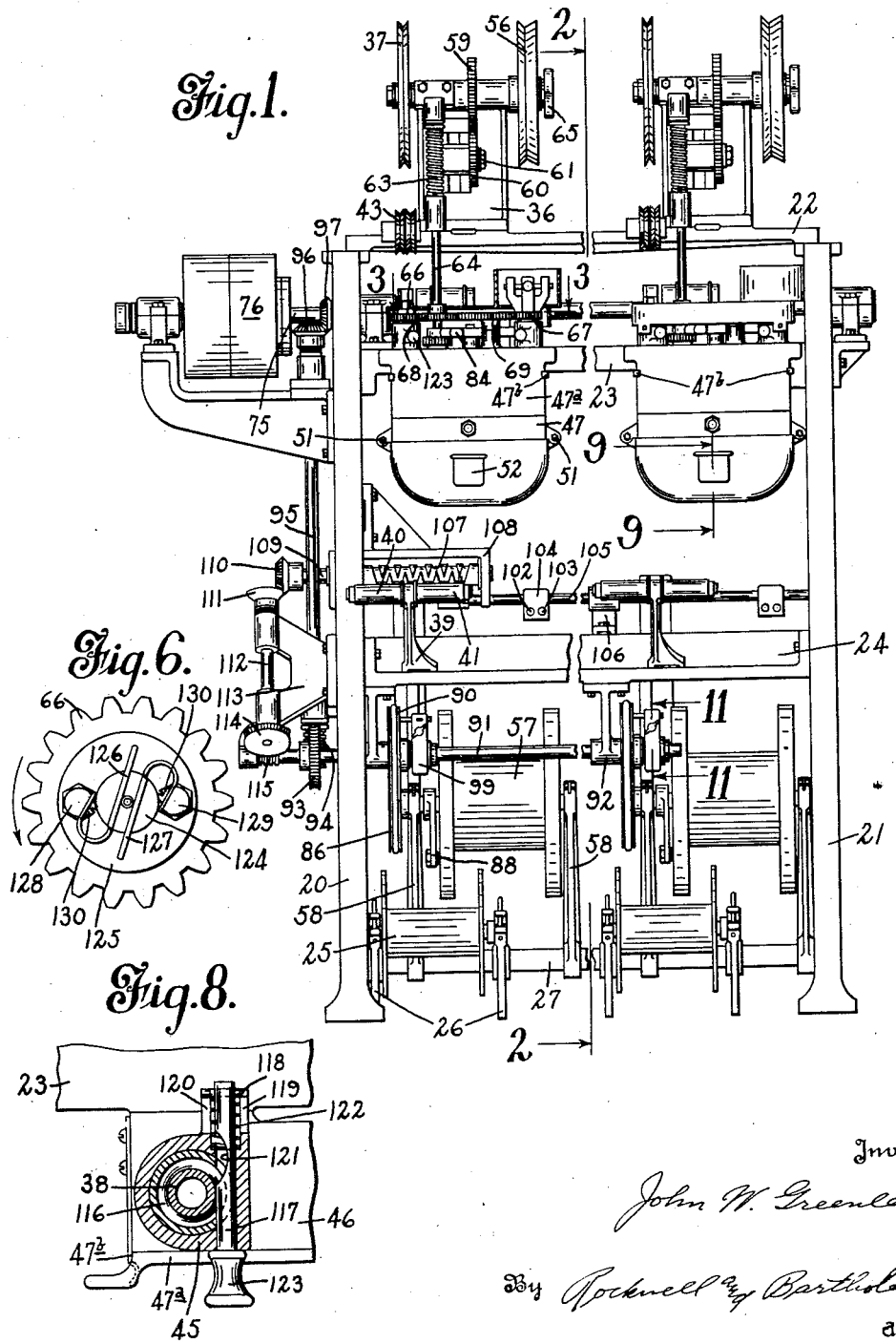

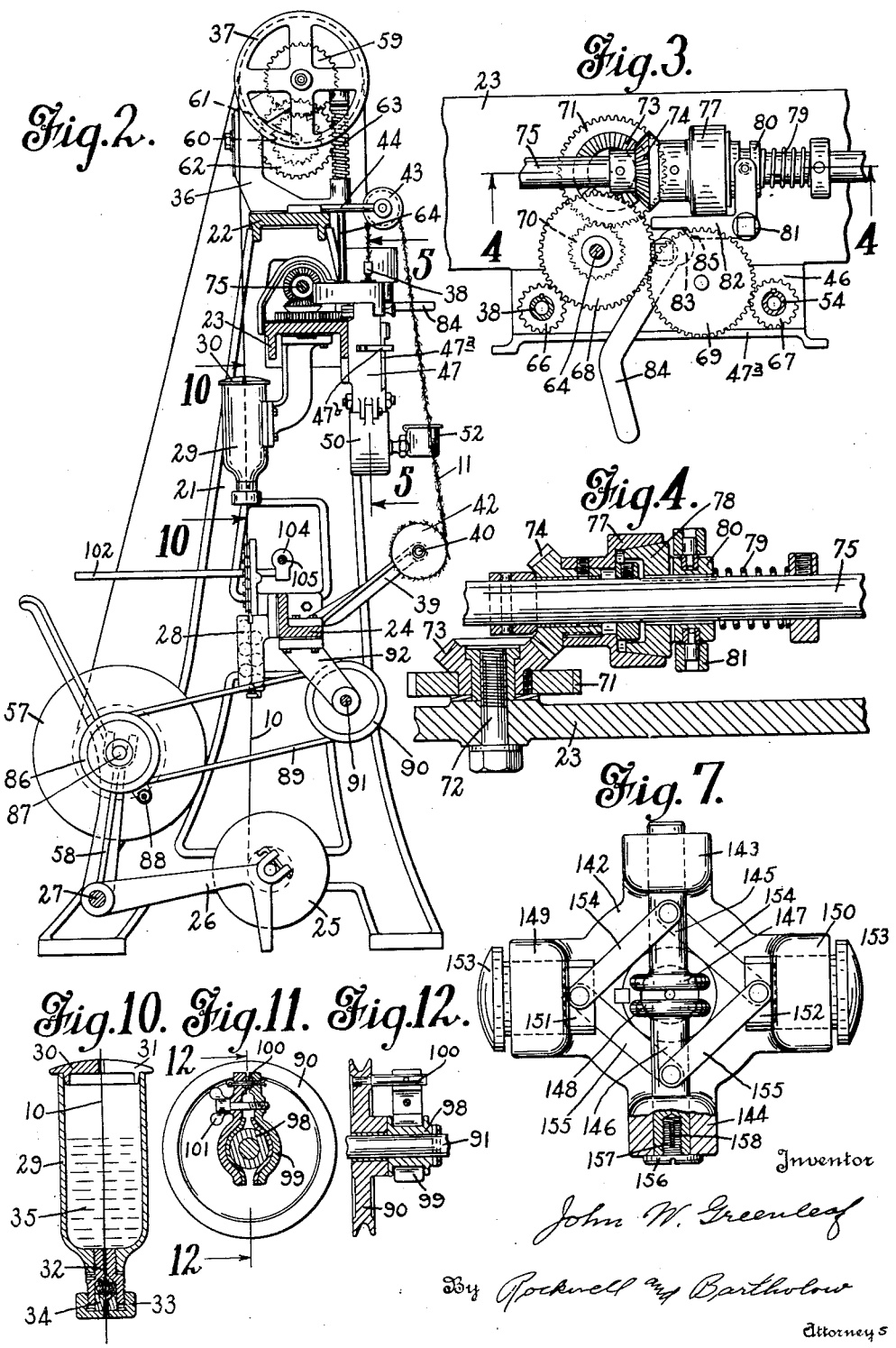

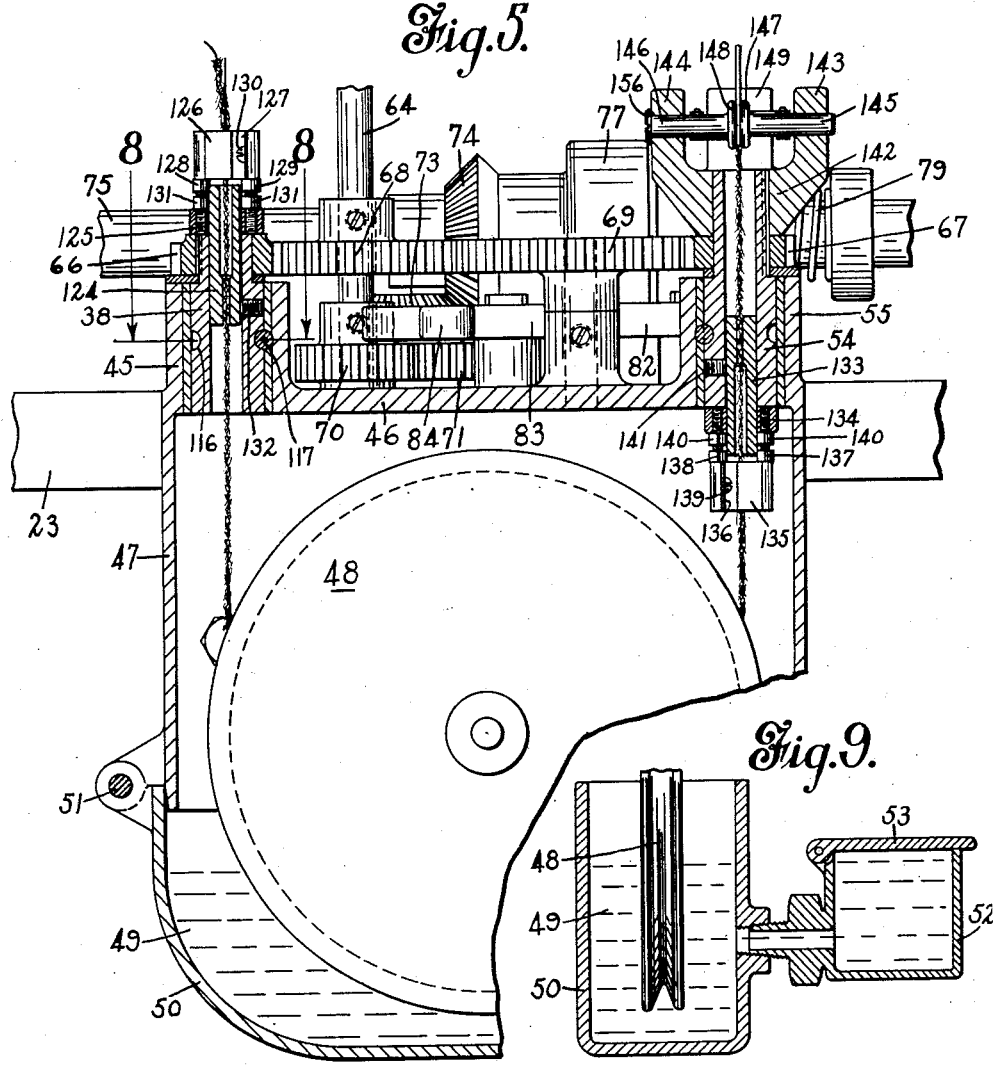

Dec. 12, 1933.  J. W. GREENLEAF  1,938,627
METHOD OF AND APPARATUS FOR MAKING INSULATED WIRE
Filed Dec. 13, 1929  4 Sheets-Sheet 4
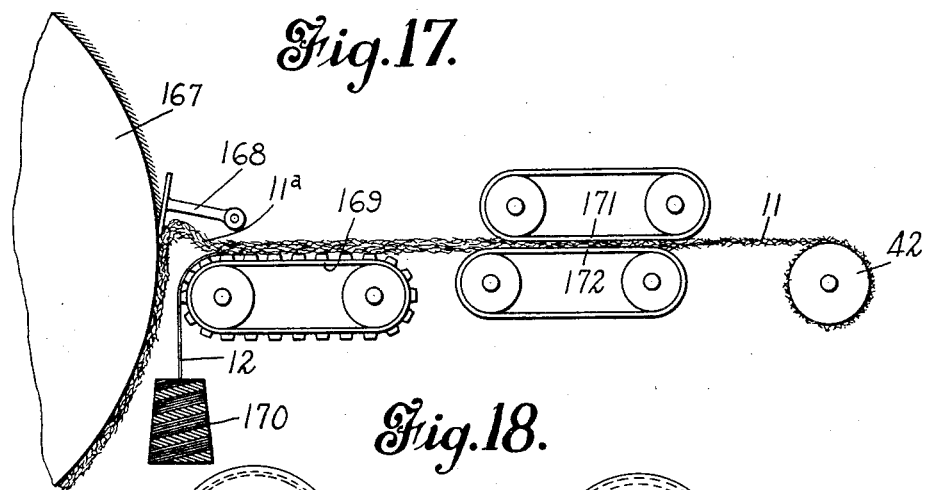
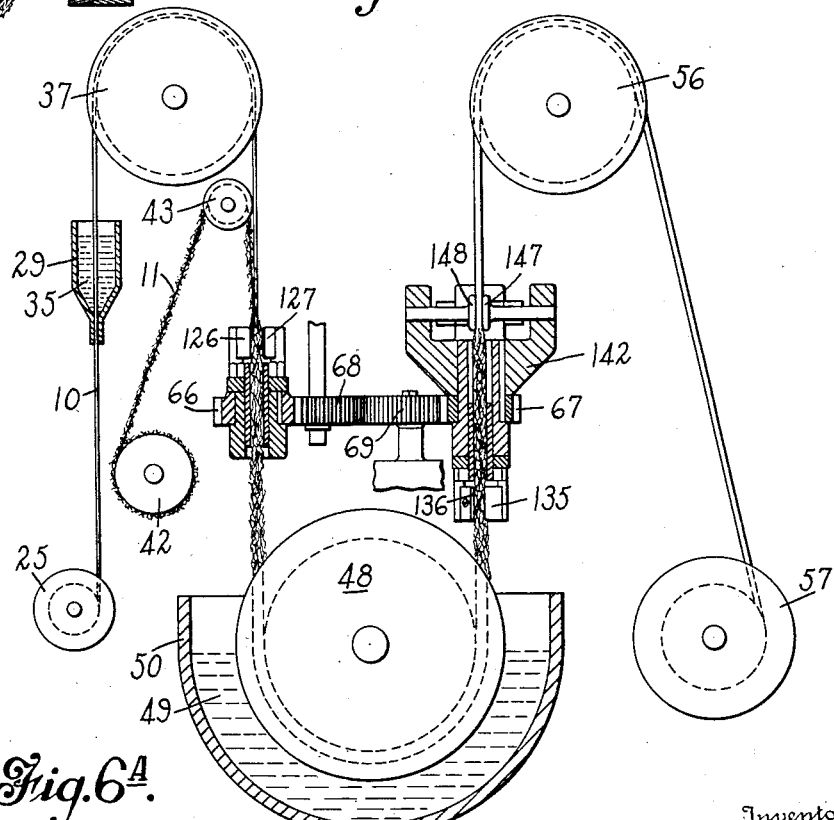
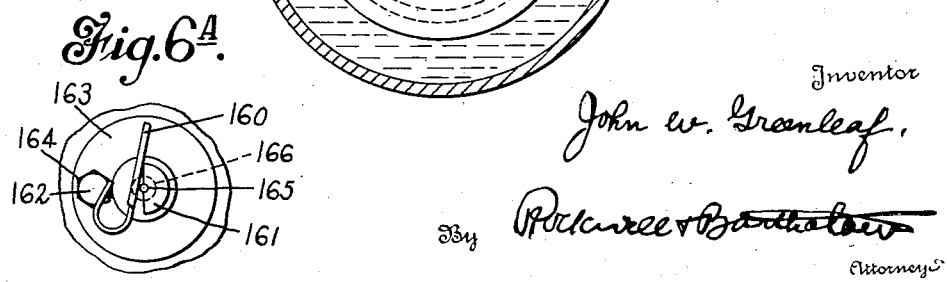

Patented Dec. 12, 1933

1,938,627

UNITED STATES PATENT OFFICE 1,938,627

METHOD OF AND APPARATUS FOR MAKING INSULATED WIRE

John W. Greenleaf, Hamden, Conn., assignor to Rockbestos Products Corporation, New Haven, Conn., a corporation of Massachusetts Application December 13, 1929
Serial No. 413,783

43 Claims. (Cl. 173—244)

This invention relates to methods and apparatus for insulating wire, and more particularly to methods and apparatus for insulating relatively fine or small gauge conductors, such as magnet wire, the insulation of which is required to be comparatively thin and flexible and to be uniform and effective throughout with respect to its insulating properties.

Because of their excellent insulating and fireproofing qualities and their adaptability to be compressed and still retain the required degree of flexibility to permit sharp bending of the wire without fracturing or opening up the insulation, asbestos fibres have been and are being used to a considerable extent to form coverings or insulating sheaths for electric conductors of certain types. This material, however, is extremely difficult to handle and to apply properly to a conductor, especially when this is done commercially, in which case it is desired to efficiently insulate the wire quite rapidly in order to maintain the production costs at a minimum. Rapid handling of this material requires extreme care, and in many instances, delicately operating apparatus, in order that the material will not be pulled apart, or otherwise separated or broken, and to insure that it will be uniformly applied both in density and thickness about the wire or conductor.

Various machines or apparatus have been devised or proposed for applying fibrous material to a conductor. One apparatus was designed to wind a roving of fibres about a conductor, to rough up the outer fibres, for instance by brushing them, and then to press the entire covering against the wire. Another apparatus for forming an insulating cover for a conductor in substantially the same manner was designed to use a reinforced sliver of fibres instead of the roving. It has also been proposed to employ apparatus for applying a plurality of rovings of fibrous material to the wire simultaneously either by winding them upon the wire or disposing them generally parallel thereto and about the same, in this instance the plurality of rovings being supplemented by a thread or the like laid in between them on the ball to prevent the rovings breaking due to pulling strains placed thereon. More recently, an apparatus has been devised which is adapted to apply a sliver of fibres directly from the carding machine upon an adhesive covered conductor and to dispose the fibres of the material in a certain arrangement upon a conductor in order that an especially thin and uniform covering would be obtained.

All of the above apparatus were such as to require extreme care while being operated, were inherently slow in operation and if commercial production was possible the cost of producing the conductor was relatively high although the product was, in some cases, efficient in use. In some instances the resultant covering was not as thin as was required and where a plurality of rovings were wound on the wire there was a tendency for the insulation to open up between windings when the conductor was sharply bent. It was found to be difficult or impossible to spread the fibres of adjacent rovings on the wire sufficiently to thoroughly intermingle the fibres and thus form a uniformly dense but thin layer, and in the manufacture of small conductors such procedure is, I believe, entirely impracticable.

The apparatus of this invention is an improvement over all of the above mentioned apparatus for insulating conductors, and the product resulting therefrom provides a conductor with an insulating covering of the required degree of thinness, uniformity and effectiveness, and the apparatus operates at a notably faster rate. For instance, the apparatus of this invention is adapted to form a wire covering of asbestos fibres which will be approximately four-thousandths of an inch in thickness, uniform in density and of the required insulation characteristics throughout its length, and to apply the same approximately four times as fast as any prior apparatus, to my knowledge, has ever before been able to do. More particularly, the apparatus of this invention is adapted to produce an insulated conductor having the structure and characteristics described and claimed in my copending application, Serial No. 413,782 filed December 13, 1929. Although asbestos fibres are preferred as the insulating material, other fibrous materials, such as, for example, cotton fibres may be used with the apparatus of this invention and, therefore, it is understood that the apparatus of this invention is not limited to the use of asbestos fibres.

One of the objects of this invention is to provide an improved method and apparatus for insulating a conductor or the like.

Another object is to provide an apparatus for insulating a conductor wherein various insulation applying mechanisms are combined and by cooperation form an insulated conductor efficiently and economically.

Another object is to provide a method and apparatus for covering a conductor with fibrous material in such a manner that the cover will be of uniform density, of the required insulating characteristics, tough, flexible and capable of withstanding very considerable lineal and bending strains without fracture or opening up to expose the conductor.

Still another object is to provide apparatus for covering a conductor with reinforced fibrous insulation whereby the fibre reinforcing means will be disposed substantially parallel to the conductor while being embedded in the insulation and extending lengthwise thereof.

A further object is to provide conductor insulating apparatus with improved driving mechanism whereby a plurality of insulation applying mechanisms may be efficiently operated in unison.

A further object is to provide in a conductor insulating apparatus an improved fibre compressing and polishing device.

Still further objects are to provide in apparatus of this type improved insulation wiping and polishing devices that are readily removable for the purpose of cleaning, repair or adjustment, and an improved mechanism for connecting the wipers and polishers to the driving means therefor.

Further objects are to provide an improved adhesive applicator, an improved compound applicator, and an improved driving mechanism for the product take-up reels.

To these and other ends, the invention consists in the novel features and combinations of parts to be hereinafter described and claimed.

In the accompanying drawings:

Fig. 1 is a front elevation of an apparatus embodying the features of this invention;

Fig. 2 is a section on line 2—2 of Fig. 1;

Fig. 3 is a section on line 3—3 of Fig. 1;

Fig. 4 is a section on line 4—4 of Fig. 3;

Fig. 5 is an enlarged section on line 5—5 of Fig. 2;

Fig. 6 is an enlarged top plan view of a wiping device;

Fig 6A is a top plan view of a modified form of wiping device;

Fig. 7 is an enlarged top plan view of a polishing device;

Fig. 8 is a section on line 8—8 of Fig. 5;

Fig. 9 is a section on line 9—9 of Fig. 1;

Fig. 10 is a section on line 10—10 of Fig. 2;

Fig. 11 is a section on line 11—11 of Fig. 1;

Fig. 12 is a section on line 12—12 of Fig. 11;

Fig. 13 is a composite view showing a conductor and the resulting covering therefor during the various stages of applying the latter to the former;

Fig. 14 is an enlarged section on line 14—14 of Fig. 13;

Fig. 15 is an enlarged section on line 15—15 of Fig. 13,

Fig. 16 is an enlarged section on line 16—16 of Fig. 13;

Fig. 17 is a view illustrating a form of apparatus which may be used for providing the sliver of fibres with a longitudinal reinforcing element; and Fig. 18 is a somewhat diagrammatic view illustrating steps incident to the application of the reinforced sliver to the wire or other core.

The apparatus of this invention is adapted to receive a conductor 10, to apply adhesive thereto, to receive a supply of fibrous sliver 11, that is reinforced by a thread or filament 12 which is embedded in the mass of fibres thereof, and to direct the conductor 10 and the reinforced sliver 11 toward each other into a position wherein the fibres of the sliver and its reinforcing thread will be disposed generally parallel to the conductor as at 13 in Figs. 13 and 14. This apparatus then wraps the sliver 11 about the conductor in such a manner that the fibres thereof adjacent the conductor will be embedded in the adhesive thereon and be disposed generally parallel to the conductor, and the outer fibres will be disposed generally circumferentially about the conductor, while maintaining the reinforcing thread 12 embodied preferably between the parallelly disposed fibres and the circumferentially disposed ones, and substantially parallel with the conductor as at 14 in Figs. 13 and 15. The apparatus then impregnates the covering with a suitable compound, removes the excess compound while slightly compressing the mass of fibres, and then further compresses the mass of fibres while polishing the surface of the covering into a compact and uniformly dense, substantially homogeneous structure as at 15, in Figs. 13 and 16.

Apparatus embodying the features of this invention and adapted to insulate a conductor in the manner described above, is illustrated in the drawings, Figs. 1 to 12 inclusive. The apparatus comprises end frames or standards 20 and 21 that are connected together by supporting bars 22, 23 and 24. A plurality of sets of wire insulating mechanisms may be supported upon the supporting bars 22, 23 and 24, and driven by a common power source whereby a plurality of wires or conductors may be insulated simultaneously under the direction and control of one operator. Two sets of such mechanisms are shown in Fig. 1, but as these are similar in construction only one will be hereinafter described in detail, except where similar parts are operated by the common control or driving element.

The wire or conductor supply reel 25 is rotatably mounted between brackets 26, which in turn are secured to a tie rod 27, extending between the standards 20 and 21 and rockably journaled therein. Above the reel 25, and mounted upon the supporting bar 24 is a wire straightening device 28 of usual structure and through which the wire must pass. Above and in line with the straightener 28 is an adhesive applicator comprising a vertically disposed receptable 29 having a cover 30 provided with a wire receiving slot 31. The bottom of the receptacle or casing 29 is provided with a threaded opening into which is threaded a hollow plug 32. A cap 33 through which the wire passes before entering the casing 29, threadingly engages the plug 32 to compress a gland 34 to prevent the adhesive leaking downwardly, the plug 32 and cap 33 being provided with a suitable opening through which the wire 10 may be threaded (see Fig. 10). The receptacle 29 is supplied with a suitable adhesive mixture 35.

Mounted upon the supporting bar 22 is a bearing supporting bracket 36 that supports a grooved idler wheel 37, one side of the periphery of which is substantially in alignment with the longitudinal axis of the casing 29, and the other side in alignment with the longitudinal axis of a vertically disposed rotatable spindle 38. The wire 10 after passing through the receptacle 29 is directed upwardly and over idler wheel 37 and then downwardly toward the spindle 38. A bracket 39, mounted upon bar 24 is adapted to support upon horizontal stud shafts 40 and 41 that extend one from each side of the bracket 39, cops 42 of reinforced fibrous slivers of insulating material. When forming the above described magnet wire only one sliver 11 is required, and therefore, only one cop 42 is supplied, but in instances where a thicker insulation is desired, two cops are provided. The sliver 11 from each cop 42 is directed upwardly and guided over a grooved pulley 43, rotatably supported upon a bracket 44, secured to bar 22. The pulleys 43 are disposed one at each side of the path of the wire 10, with the periphery of the groove therein in alignment in one plane with the axis of the spindle 38, whereby a sliver 11 passing therefrom will be disposed parallel with the wire 10, but slightly to one side thereof. When two slivers 11 are provided, one will be adjacent one side of the wire and the other will be adjacent the other side thereof.

The spindle 38 is journaled in a hollow boss 45 (Fig. 5), that forms part of the closed top 46 of a compound applicator casing 47. Rotatably supported between the sides of casing 47 is a grooved wheel 48, the bottom portion of the periphery of which is immersed in an insulating and fire-proofing compound 49, held in a bottom cover 50. The bottom cover 50 is hingedly secured to the casing 47 at 51, whereby it may be released and swung downwardly or entirely removed, as desired. A casing filling and level indicating spout 52 (Fig. 9) is disposed in communication with the interior of the bottom cover 50, the spout 52 being provided with a hinged cover 53 to prevent foreign matter entering therein and permitting observation of the level of the compound retained thereby that indicates the level of the compound within applicator casing 47. A portion 47ª (Fig. 1) of the front side of the casing 47 is removable to expose the interior thereof for inspection. Spring catches 47ᵇ are provided to retain the portion 47ª in place. The periphery of the wheel 48 at one side, is in substantial alignment with the axis of the spindle 38, and at the other side with the axis of a spindle 54. The spindle 54 is journaled in a hollow boss 55, also forming part of the closed top 46 of the casing 47.

A power driven capstan 56 is rotatably mounted upon the bracket 36. The sliver covered wire passing upwardly from casing 47 is given one or more turns over the capstan 56 and then directed downwardly toward and on to a power driven take-up reel 57. The reel 57 is rotatably mounted between a pair of brackets 58, that are secured to the rod 27. The capstan 56 and a gear 59 are secured to a common shaft and the gear 59 is in mesh with a pinion 60 secured to one end of a short shaft 61, supported upon the bracket 36. A worm wheel 62 is secured to the other end of a shaft 61 and is driven by a worm 63, secured to a vertically disposed shaft 64. When rotated, the capstan 56 draws the wire 10 from the reel 25 upwardly through the straightener 28, the adhesive applicator 29, over the idler wheel 37, which is rotated thereby, and then, with the thread reinforced sliver of fibres 11, downwardly through spindle 38, through the compound applicator, over the wheel 48 which is rotated thereby, and upwardly through the spindle 54. Preferably, the capstan 56 is secured to its shaft by means of a suitable friction clutch, the friction of which is adjustable by means of a handle 65.

The spindles 38 and 54 are rapidly rotated at a rate of speed proportional to the speed of rotation of the capstan. This is accomplished by means of pinions 66 and 67, secured respectively to spindles 38 and 54. A gear 68 is secured to shaft 64, in mesh with pinion 66, and also in mesh with a gear 69, that in turn is in mesh with pinion 67. Spindles 38 and 54 are rotated at substantially the same speed and in the same direction about the conductor. A pinion 70 is also secured to shaft 64 and is in mesh with a gear 71 rotatably supported upon a stud shaft 72 (Fig. 4) upon which a bevel gear 73, which is secured to gear 71, is rotatably mounted. The bevel gear 73 is in mesh with another bevel gear 74, rotatably mounted upon a common driving shaft 75. The shaft 75 extends between the frames 20 and 21, being journaled at each in suitable bearings. The shaft 75 extends beyond frame 20 and has a power driven pulley 76 secured thereto. Shaft 75 is, therefore, adapted to supply power to each of the sets of mechanisms supported upon bars 22, 23 and 24.

A separate cone clutch is provided for each set of mechanisms and comprises a female clutch member 77 (Fig. 4), that is secured to the bevel gear 74, and a male clutch member 78 that is keyed or otherwise secured to shaft 75 for rotation therewith while being slidable axially thereon. A coiled compression spring 79 tends to retain the clutch member 78 in clutched relation within member 77. The member 78 is provided with a grooved collar 80 in the groove of which rollers secured to one arm of a bell crank 81 are disposed so that the members 77 and 78 of the clutch may be separated into unclutched position by movement of the bell crank in a direction against the action of spring 79. The other arm 82 of the bell crank is engaged by a cam end 83 of a lever 84, that extends forwardly beyond the casing 47. The cam end 83 of lever 84, is adapted to rock the bell crank 81 when moved in one direction, due to its engagement with the arm 82 thereof. By provision of a flattened portion 85 upon the cam end 83, the parts may be retained in clutched position when so disposed and locked against possible accidental movement, due to vibration or the like. When the members 77 and 78 are clutched together, the spindles 38 and 54 are rapidly rotated and capstan 56 is rotated at such speed that the wire will be drawn through said spindles at the proper linear speed in respect thereto.

The take-up reel 57 is rotated in such a manner that the wire between it and the capstan 56 will be maintained taut. A pulley 86 is mounted upon a shaft 87 that is journaled in the brackets 58. The free end of an arm 88, which is secured to the shaft 87, is adapted to engage the reel 57 to connect it to the shaft 87. A belt 89 rotatably connects pulley 86 to a pulley 90, that is rotatably mounted upon a shaft 91. The shaft 91 extends between the frames 20 and 21, being journaled in brackets 92, secured to bar 24, and forms the common driving means for all of the take-up reels of the various mechanisms mounted upon bars 22, 23 and 24.

The shaft 91 extends beyond the frame 20 and has a worm wheel 93 secured thereto that is in mesh with a worm 94 secured upon a vertical shaft 95. A bevel gear 96, secured to the shaft 95, is in mesh with a bevel gear 97, secured to the common driving shaft 75. By proper proportion between the gears driving the take-up reel 57 and those driving the capstan 56, the desired speed ratio therebetween is secured. The pulley 90 is drivingly connected to the shaft 91 by means of a friction drive, comprising a grooved sleeve 98 (Figs. 11 and 12) that is secured to the shaft 91, and a pair of friction fingers 99 that are secured at one end thereof to a pin 100, extending outwardly from one face of the pulley 90. The other ends of the fingers 99 embrace the sleeve 98 within the groove thereof, being drawn into tight engagement therewith by means of a thumb screw 101. By adjustment of the thumb screw 101, the degree of friction may be varied to permit the fingers 99 to slip about the sleeve 98 should conditions such as a stoppage in the feed of the wire to the take-up reel, require it.

Wire guiding devices comprising a pair of rods 102 and 103, one disposed at each side of the insulated wire being wound upon the reel 57, are connected to a member 104, which is secured to a slidable rod 105, mounted in brackets 106 upon bar 24. A device 107, known as a Yankee thread is secured to a shaft 109, which is journaled in a bracket 108, secured to the frame 20, and reciprocates the rod 105 to move the guide rods 102 and 103 across the face of the reel 57. A bevel gear 110 is secured to a portion of the shaft 109 that extends beyond frame 20, and is in mesh with a bevel gear 111, secured to a shaft 112, journaled in a bracket 113, secured to frame 20. A worm wheel 114, in mesh with a worm 115, secured to shaft 91, is secured to shaft 112. Due to properly proportioning the gearing driving the rods 102 and 103 with the drive for the take-up reel 57, the insulated wire is evenly wound thereupon.

The spindles 38 and 54 are readily removable from their respective bearing bosses 45 and 55. As the structure permitting this is the same for each spindle, only one such structure will be described. Referring to Figs. 5 and 8, the spindle 38 is provided with a peripheral groove 116. A pin 117 extends through the boss 45 to one side of the spindle mounted therein, and is disposed in the groove 116 in said spindle. The pin 117 is retained against turning by being guided by a transverse pin 118 that rides in a slot 119, formed in a lateral extension 120 of the boss 45. The pin 117 is cut away as at 121, at a portion thereof, in such a manner that when the pin is in a certain position the spindle may pass by the pin. A spring 122 tends to retain the uncut portion of the pin 117 within the groove 116, in the spindle, to retain the spindle against removal. By pulling outwardly upon a thumb-piece 123, provided on the pin 117, the cut-away portion 121 thereof may be aligned with the spindle to permit the removal thereof out of its bearing boss.

A hollow stem 124 is disposed within the spindle 38 and extends upwardly therefrom (see Figs. 5 and 6). A collar 125 surrounds and is secured to the upper end of stem 124. A pair of opposed resilient fingers 126 and 127 are secured to the upper ends of screws 128 and 129 respectively, by screws 130. The screws 128 and 129 are threaded into the collar 125, one on either side of the stem 124, and are retained in place by lock nuts 131. By loosening the lock nuts 131 and turning screws 128 and 129, the spring tension of the fingers 126 and 127 upon the wire disposed therebetween may be varied as desired. The stem 124 is secured to spindle 38 by a set screw 132.

In the modified form of wiper shown in Fig. 6A, a single resilient finger 160 is provided that presses against the wire and cooperates with a vertically disposed stud 161 to wrap and compact the sliver of fibres while disposing the outer fibres circumferentially about the wire. The resilient finger 160 is secured to the upper end of a screw 162 that is threaded into a collar 163. The screw 162 is retained in place on the collar 163, and in position with respect to the stud 161 by means of lock nut 164. By loosening the lock nut 164 the screw 162 may be turned to vary the spring tension of the finger 160 upon the wire disposed between it and the stud 161. The stud 161 is provided with an axially disposed groove 165 that communicates with a bore 166 in the lower portion thereof. The groove 165 is of proper dimension to cause the sliver to be compacted the desired amount therein by the resilient finger 160, and the bore 166 is of sufficient dimension to freely pass the wire without its coming into contact therewith.

A hollow stem 133 is disposed within the spindle 54 and extends downwardly therefrom into casing 47. A collar 134 is secured to the lower end of stem 133. A pair of opposed resilient fingers 135 and 136 are secured to the lower ends of screws 137 and 138 respectively, by screws 139. The screws 137 and 138 are threaded into the collar 134, one on either side of the stem 133, being retained in place by lock nuts 140. The resilient fingers 135 and 136 may be adjusted to vary the spring tension thereof upon the wire disposed therebetween by screws 137 and 138. The stem 133 is secured to the spindle 54 by means of a set screw 141.

The spindle 54 extends above the boss 55 and pinion 67 into the base 142 of a polishing head (see Figs. 5 and 7), and is keyed or otherwise secured thereto. Diametrically opposed and upwardly directed lugs 143 and 144 are secured to or formed integral with the base 142, each being provided with an opening in which respectively the shank portions 145 and 146 of polishing plates 147 and 148 respectively, are slidably mounted. Each of the polishing plates 147 and 148 is provided with a smooth polishing surface upon the face thereof, that is in opposed relation with the corresponding face of the other plate. Upwardly directed and diametrically opposed lugs 149 and 150, that are disposed substantially at right angles to lugs 143 and 144 are also secured to or formed integral with the base 142. Plungers 151 and 152 are slidably mounted in suitable openings in lugs 149 and 150, respectively. The plungers 151 and 152 are headed as at 153 to limit their movement inwardly toward the axis of the polishing head.

A pair of links 154 and 155 are pivoted to each plunger 151 and 152. Links 154 of each pair are pivotally secured to the shank portion 145 of polishing plate 147, and links 155 of each pair to shank portion 146 of the polishing plate 148, whereby movement of the plungers 151 and 152 outwardly away from the axis of the base 142 and of the spindle 54 due to centrifugal force developed by the rapid rotation of spindle 54, will draw the opposed polishing plates 147 and 148 toward each other and cause pressure upon the wire disposed therebetween. One of the shank portions, in this instance 146, is provided with a headed screw 156, the shank 157 of which is threaded into the end of the shank portion 146, the head thereof being of a diameter to prevent its passing into the opening in the lug 144 and thus limit the inward movement of the polishing plates 147 and 148. The threaded shank 157 is slotted as at 158, and the parts thereof are sprung apart to provide a friction grip therefor to prevent the accidental unscrewing thereof by vibration or the like.

In apparatus as above described, provision is made to direct the wire 10 after applying an adhesive thereto, and the sliver 11, adjacent and substantially parallel to each other before wrapping the sliver about the wire. This enables the sliver to be wrapped about the wire by the action of the first wiper so as to encircle it completely and disposes the generally parallel fibres of the sliver adjacent to the wire in readiness to be pressed thereagainst and into the adhesive thereon, whereby the inner fibres will be retained against disturbance while the fingers 126 and 127 of the wiper continue their rapid rotation in pressing engagement with the outer fibres to dispose them generally circumferentially about the wire. The wiper rotates at high speed, for example 1600 R. P. M. The structure provided also insures that the reinforcing thread 12 will be taut and disposed substantially parallel to the wire, in which position it will be retained due to the retaining action of the parallelly disposed fibres that have become embedded in the adhesive, and which, being interengaged around and about this thread, retain it relatively thereto. The wiping action of the fingers 126 and 127, when first engaging the sliver 11 as it enters therebetween, wraps it about the wire 10. These fingers then compress the mass of fibres while disposing the outer ones generally circumferentially about the wire during the passage of the same therebetween. Due to the spring tension of the fingers 126 and 127 being adjustable, the action thereof may be varied as required. The modified form of wiper shown in Fig. 6^A operates in substantially the same manner upon the wire as the form shown in Fig. 6 does.

In my new method of insulating conductors by the application of asbestos or other fibrous coatings or coverings thereto, I embed a fine reinforcing filament of indefinite length, such as a cotton thread, in a sliver of interentangled fibres of asbestos, for example, with the filament located at the middle of the mass of fibres and with the fibres generally longitudinally disposed. This reinforced sliver, which is preferably flattened in cross-section, as shown in Fig. 14 of the drawings, and is of a width to encircle the metal conductor or core member without substantial overlapping, is brought into substantial parallelism with the adhesive-coated core member or wire and permitted to come gradually into contact therewith so as to adhere to the same, and a portion of the sliver is folded substantially circumferentially about the wire so that the sliver encircles and adheres to the wire, and during this operation the unattached portion of the sliver is maintained in proper position for progressive folding about the wire by controlling the position of the filament or reinforcing thread in the unattached portion of the sliver. It will be understood that as the flat sliver contacts with the adhesive-coated wire it is carried along with the moving wire in approximate parallelism therewith, while the contacting portion of the sliver is wrapped about the wire so that it encircles the same and is applied thereto, and that the reinforcing element of the sliver carries fibres progressively into position for application to the wire and holds the sliver in proper position for wrapping. The approximately tangential position of the sliver with respect to the wire before wrapping is illustrated in Fig. 14.

In Fig. 17 I have illustrated apparatus suitable for the production of the reinforced sliver consisting of thoroughly interentangled but generally longitudinally disposed fibres, in which sliver the textile thread or other reinforcing filament is embedded. In this view the doffer roll 167 of a carding machine is shown delivering by the action of a comb 168 a sliver 11^a of asbestos fibres upon a forwardly travelling belt 169. The sliver is laid upon a cotton thread or other suitable filamentary member 12 supported on and moving with the belt. As a result of the forwardly directed movement of the belt and sliver the thread is unwound from a ball or roll 170. The sliver of fibres when delivered to the belt drops upon the thread 12, and with it is fed forwardly and between a pair of cooperating rub-motion belts 171 and 172, which, by known driving mechanism, are given simultaneously forwardly progressing and lateral movements. The action of the rub-motion belts 171 and 172 upon the sliver 11^a and thread 12 causes the fibres to be wrapped about the thread, positioning the thread substantially in the center of the body of fibres, as well as slightly compressing and thoroughly intermingling the fibres. The thread reinforced sliver 11, formed as above described, is then wound upon a reel 42, during which operation the sliver is slightly flattened but without disturbing the relative position of the fibres with respect to each other or to the thread 12. While interentangled, the fibres are substantially parallel with the thread owing to the fact that they have not been displaced to any substantial extent from their generally parallel position as delivered by the carding machine.

While being directed through the compound 49 by means of the wheel 48, the mass of fibres is thoroughly impregnated with insulating compound that is also adapted to act as a fibre binder. The provision of the removable side portion 47^a permits the inspection of the interior of the casing and of the operation being performed therein, while the provision of the combined filling spout and level indicator 52 permits the observation of conditions in regard to the quantity of compound within the casing without removing the portion 47^a. The fingers 135 and 136 by engagement with the covered wire as it leaves the compound 49 and wheel 48, slightly squeeze the covering and remove excess compound therefrom while compressing the fibres about and against the wire. By being adjustable in respect to the spring tension thereof, the fingers 135 and 136 may be controlled to vary the amount of compound permitted to remain in the covering.

The structure of the polishing head whereby the operation of plates 147 and 148 upon the covered wire is caused by centrifugal force acting upon the plungers 151 and 152, insures that the covering will be of uniform thickness about the wire, the movement of the plates inwardly against the wire, due to the arrangement of the links 154 and 155, connecting the same with the plungers, being of equal amount and pressure. The provision of the movement limiting screw 156 that prevents inward movement of the plates beyond a predetermined amount, insures that the covering of the entire length of the covered wire will not be thinner than the desired minimum of thickness.

The structure whereby the spindles 38 and 54 may be readily removed without disturbing other parts of the apparatus is especially advantageous. These devices may require occasional cleaning or adjustment due to the nature of fibrous material and the use of an adhesive and an insulating compound, whereby these devices may become slightly clogged, or it may be desirable to replace them if worn, or for some other reason.

The adhesive applicator 29 being of a type and structure whereby the wire must pass substantially vertically therethrough insures an even distribution of the adhesive about the wire. The disposition of this adhesive applicator and the fact that the wire is moved upwardly therefrom, permit excess adhesive to drain back into the casing and permit an adhesive covering of the desired thickness to remain upon the surface of the conductor.

The provision of separate driving clutches for the spindles and capstan of each set of mechanisms in a multiple machine, and of individually operable friction drives for the take-up reels, facilitates the operation of a plurality of spindles by one operator. The arrangement of the drives for the capstan, spindles and take-up reels whereby a common power driven pulley may be provided for a plurality of such mechanisms greatly simplifies the structure of the machine as a whole and permits the proper speed proportions of the moving parts to be maintained. The combination of the above described devices and the operating mechanisms therefor, as arranged in the preferred form of apparatus shown, insures the efficient production of an insulated wire or conductor that is of the form and structure desired.

While I have shown and described a preferred embodiment of my invention, it is understood that it is not to be limited to all of the details shown, but is capable of modification and variation which will lie within the spirit of the invention and the scope of the appended claims.

What I claim is:

1. The method of insulating a conductor or the like, which comprises enclosing a filamentary member within an untwisted sliver of fibrous insulating material with the fibres thereof disposed generally parallel therewith, wrapping the reinforced sliver about the conductor with the filamentary member and the fibres adjacent the conductor substantially parallel thereto, disposing the outer fibres generally circumferentially thereabout and then compressing the entire mass of fibres into a substantially homogeneous body.

2. The method of insulating a conductor or the like, which comprises enclosing a filamentary member within an untwisted sliver of fibrous insulating material with the fibres thereof disposed generally parallel therewith, wrapping the reinforced sliver about an adhesive covered conductor while maintaining the filamentary member taut and parallel to the conductor and the fibres adjacent the conductor generally parallel thereto, then disposing the outer fibres generally circumferentially thereabout, and then compressing the entire mass of fibres into a substantially homogeneous body.

3. The method of insulating a conductor or the like, which comprises enclosing a filamentary member within and at the center of an untwisted sliver of fibrous insulating material, feeding this material into parallelism with a conductor, wrapping it about the conductor by a wiping action which disposes the outer fibres generally circumferentially thereabout, and maintaining the filamentary member and the fibres adjacent the conductor generally parallel thereto, and then compressing the entire mass of fibres into a substantially homogeneous body.

4. The method of making an insulated electrical conductor which comprises incorporating with an attenuated body of generally parallel fibres a textile reinforcing element, coating the surface of the conductor with an adhesive, applying the reinforced body to the adhesive-covered surface with the body extending substantially parallel to the conductor, and folding the body about the conductor in a generally circumferential direction and compressing it.

5. The method of applying an insulating covering to an electrical conductor which comprises embedding a filament generally longitudinally in a sliver of fibres extending generally parallel to the sliver, covering the surface of the conductor with an adhesive, bringing the sliver into adjacent and substantially parallel relation to the conductor, and folding the sliver about the conductor in a generally circumferential direction and compressing and smoothing it.

6. The method of applying an insulating covering to an electrical conductor, which comprises embedding a reinforcing filament longitudinally in a sliver of fibres which extend generally parallel to the filament, bringing the sliver and conductor into generally parallel and adjacent relation, and then applying the sliver to the conductor surface by folding it thereabout while such generally parallel relation of conductor and sliver is maintained and causing the sliver completely to encircle and coat the conductor.

7. The method of applying an insulating covering to an electrical conductor, which comprises embedding a textile reinforcing thread in a sliver, applying an adhesive to the surface of the conductor, bringing the thread-reinforced sliver into substantially parallel and adjacent relation to the conductor, folding the sliver about the conductor so that it completely encircles and encloses the same, compressing the fibrous covering, and then impregnating and smoothing the covering.

8. The method of making an insulated electrical conductor which comprises embedding a filament in a sliver of fibres, bringing the filament-reinforced sliver of fibres into substantial parallelism with the wire to be covered and applying it to the wire by a rapid circumferential wiping action during which the filament is extraneously held to control the position of the sliver.

9. The method of making an insulated electrical conductor which comprises coating a wire with an adhesive, bringing a flat sliver of fibres into substantial parallelism with the adhesive-coated wire, causing the sliver gradually to contact with the wire, and folding it thereabout adjacent the point of contact by a rapid circumferential wiping action.

10. The method of making an insulated electrical conductor which comprises bringing a flat sliver of fibres into tangential position relatively to a wire and while holding the sliver in the tangential position folding the sliver about the wire by a rapid generally circumferential wiping action.

11. The method of making an insulated electrical conductor which comprises moving an adhesive-coated wire progressively in a substantially vertical direction, moving a flat sliver of fibres progressively in the same direction and gradually into contact with the wire, and folding the sliver about the wire to cause it to encircle the same by moving a resilient wiping member continuously in one direction generally circumferentially about the wire.

12. The method of making an insulated electrical conductor which comprises moving an adhesive-coated wire progressively in one direction, moving a filament-reinforced flat sliver of fibres progressively in the same direction and in proximity to the wire, wiping the sliver about the wire, and maintaining the filament in the sliver taut during this operation so that the position of the sliver is held under control.

13. The method of making an insulated electrical conductor which comprises moving an adhesive-coated wire progressively in one direction, moving a flat sliver of fibres having a longitudinal embedded reinforcing filament therein in the same general direction as the wire in proximity to the wire so that the sliver comes gradually into contact with the adhesive on the wire, folding the sliver about the wire, and holding the sliver filament and thereby the sliver in substantially parallel relation to the wire during the folding process.

14. The method of making an insulated electrical conductor which comprises moving an adhesive-coated wire progressively in one direction, moving a filament-reinforced flat sliver of fibres in the same general direction in proximity to the wire so that the sliver comes gradually into contact with the adhesive on the wire, and then folding the contacting portion of the sliver about the wire by moving rapidly about the wire a resilient wiper in contact with the sliver and maintaining the sliver filament under tension during this operation so that when applied to the wire it extends in general parallelism therewith.

15. The method of making an insulated electrical conductor which comprises bringing into close proximity to and substantial parallelism with the wire to be covered a flat sliver of fibres which is of such width as will enable the sliver when folded about the wire to encircle the same without substantial overlapping, holding the sliver in substantial parallelism with the wire and substantially tangent thereto, and while so holding it, folding it about the wire in a substantially circumferential direction.

16. The method of making an insulated electrical conductor which comprises embedding a reinforcing filament in a sliver of interentangled fibres, bringing the reinforced sliver into substantial parallelism with an adhesive-coated wire and permitting it to come gradually into contact therewith, folding a portion of the sliver substantially circumferentially about the wire so that the sliver embraces and adheres to the wire, and maintaining the unattached portion of the sliver in proper position for progressive folding about the wire by controlling the position of the filament in the unattached portion of the sliver.

17. The method of making an insulated electrical conductor which comprises bringing into substantial parallelism with and in close proximity to an adhesive-coated wire a flat sliver of fibres of a width approximating the circumferential dimension of the wire, and folding the sliver about the wire to cause it to encircle it without substantial overlapping and adhere to the same.

18. The method of making an insulated electrical conductor which comprises applying an adhesive to a bare wire and moving the wire longitudinally, bringing a sliver of loose fibres having an embedded longitudinal reinforcing element into contact with the adhesive-coated wire at one side thereof so that it adheres to the wire and is carried along with the moving wire in approximate parallelism therewith, wrapping the contacting portion of the sliver about the wire so that it encircles the same and is applied thereto, and causing the reinforcing element of the sliver to carry fibres progressively into position for application to the wire and to hold the sliver in proper position for wrapping.

19. Apparatus for covering a conductor with insulating material, composed of generally parallelly disposed entangled fibres substantially evenly distributed about a reinforcing filament, comprising means to direct the conductor, the insulating material, and the reinforcing filament therefor adjacent to and generally parallel with each other, means to engage the insulating material and to wrap it about the conductor while disposing the fibres lying at the surface thereof generally circumferentially with respect to the conductor without disturbing the parallel arrangement of the remaining fibres and of the reinforcing filament, means to draw the conductor lengthwise and to maintain the reinforcing filament taut and means to compress the insulating material and to smooth the outer surface thereof.

20. Apparatus for covering a conductor with insulating material composed of generally parallelly disposed entangled fibres substantially evenly distributed about a reinforcing filament, comprising means to apply an adhesive to the surface of the conductor, means to direct the conductor, the insulating material and the reinforcing filament therefor adjacent to and generally parallel with each other, means to engage the insulating material and to wrap it about the conductor while disposing the fibres lying at the surface thereof generally circumferentially with respect to the conductor without disturbing the parallel arrangement of the remaining fibres and of the reinforcing filament, means to draw the conductor lengthwise and to maintain the reinforcing filament taut, means to impregnate the insulating material with a fibre binding compound, and means to compress the insulating material and to smooth the outer surface thereof.

21. In apparatus for insulating a conductor, a compound applicator casing having a closed top, a pair of vertically disposed and spaced apart spindle bearings in said casing top, rotatable spindles removably journaled in said bearings, means to rotate said spindles, and means to releasably retain said spindles in said bearings.

22. In apparatus for insulating a conductor, a compound applicator casing having a closed top, a pair of spindle bearings in said casing top, a wheel rotatably mounted in said casing, the periphery of one side of said wheel being in alignment with the axis of one of said bearings, and of the other side of said wheel being in alignment with the axis of the other of said bearings, removable spindles in said bearings, and means to releasably retain said spindles therein.

23. In apparatus for insulating a conductor, insulating material compressing and polishing means comprising a pair of opposed plates, means to rotate said plates about an insulated conductor, said plates being slidably mounted transversely with respect to the axis of the rotation thereof, centrifugally movable members, and means connecting each of said members to each of said plates.

24. In apparatus for insulating a conductor, insulating material compressing and polishing means comprising a pair of opposed plates, means to rotate said plates about an insulated conductor, said plates being slidably mounted transversely with respect to the axis of the rotation thereof, centrifugally movable members, means connecting each of said members to each of said plates, and means to limit the sliding movement of said plates toward each other.

25. In apparatus for insulating a conductor, a pair of opposed polishing plates having outwardly directed shank portions, a rotatable frame for guiding said shank portions, and sliding centrifugally operated members guided in said frame and angularly offset with respect to said plates on the frame and operatively connected with said shank portions.

26. In apparatus for insulating a conductor, a pair of opposed polishing plate members, a rotatable frame in which said plate members are mounted for sliding movement at opposite points, diametrically opposite centrifugally acting members mounted on said frame and disposed in a line substantially at right angles to the axis of said plate members, and means for connecting said centrifugally acting members operatively with said plate members.

27. In apparatus for insulating a conductor, a pair of opposed polishing plate members, a rotatable frame in which said plate members are mounted for sliding movement at opposite points, diametrically opposite centrifugally acting members mounted on said frame and disposed in a line substantially at right angles to the axis of said plate members, and means for connecting said centrifugally acting members operatively with said plate members, including link members connecting each centrifugally acting member with both of the plate members.

28. A polishing device for wire insulating machines comprising a rotary frame, a pair of oppositely disposed centrifugally acting members slidably mounted in said frame, a pair of oppositely disposed members angularly offset from said first members for acting on the wire on opposite sides thereof, slidably mounted in said frame, each of said last named members being operatively connected to each of said first named members, and all of said members being slidable perpendicularly to the axis of rotation of said frame and in substantially the same transverse plane.

29. A polishing device for wire insulating machines comprising a rotary frame, oppositely disposed centrifugally acting members guided in said frame for sliding movement, a pair of oppositely disposed members angularly offset from said first members for acting on the wire at opposite sides, and connections between said last-named members and said centrifugally acting members, all of said members being movable substantially perpendicularly to the axis of rotation of said frame in substantially the same transverse plane.

30. A polishing device for wire insulating machines comprising a rotary frame, oppositely disposed centrifugally acting members guided in said frame for sliding movement, a pair of oppositely disposed members for acting on the wire at opposite sides, and connections between said last-named members and said centrifugally acting members, all of said members being movable substantially perpendicularly to the axis of rotation of said frame, the members for acting on the wire having sliding shank portions in a line substantially at right angles to the axis of the centrifugally acting members.

31. A polishing device for wire insulating machines comprising a rotatable frame having guide lugs disposed in two pairs, the lugs of one pair being aligned with each other and at right angles to the axis of those of the other pair, polishing members guided in the lugs of one pair, centrifugally acting operating members guided in the lugs of the other pair, and means of connection between each operating member and both of the polishing members.

32. In a machine for making insulated electrical conductors, the combination of means for progressively advancing a wire, means for moving into generally parallel and close relation to the wire a flat thin strip of loose fibres having an internal longitudinal reinforcing filament, rotatable means for wiping a portion of the strip circumferentially about the wire, and means for holding the reinforcing filament substantially parallel to the wire while the wiping takes place.

33. In a machine for making insulated electrical conductors, the combination of means for progressively advancing a wire, means for moving into generally parallel and close relation to the wire a flat sliver of fibres having an internal longitudinal reinforcing filament, rotatable means for wiping a portion of the sliver circumferentially about the wire, and means for holding that portion of the sliver reinforcing filament which is adjacent to the wiping means and free from the wire substantially parallel to the wire while the wiping takes place.

34. In a machine for making insulated electrical conductors, the combination of means for applying adhesive to a wire, means for moving in substantial parallelism and in the same direction in close proximity to each other the adhesive-coated wire and a flat sliver of fibres having a reinforcing filament so that the sliver comes gradually into contact with the adhesive-coated wire, rotatable means for wiping the contacting portion of the sliver about the wire, and means for acting upon the reinforcing filament to hold the unattached portion of the sliver substantially parallel to the wire while the wiping takes place.

35. In a machine for making insulated electrical conductors, the combination of means for applying an adhesive to a wire, means for moving in substantial parallelism and in the same direction in close proximity to each other the adhesive-coated wire and a flat sliver of fibres having a reinforcing filament so that the sliver comes gradually into contact with the adhesive-coated wire, rotatable means for wiping the contracting portion of the sliver about the wire, and means for acting upon the reinforcing filament to prevent the wiping means from rupturing the unattached portion of the sliver coming into position for application to the wire, said last-named means including means for acting upon the reinforcing filament to hold the unattached portion of the sliver substantially parallel to the wire.

36. In a machine for making insulated wire, means for progressing the wire in a substantially vertical direction, means for moving a flat sliver of fibres having a reinforcing filament extending lengthwise thereof substantially vertically into generally parallel and close relation to a portion of the wire, rotatable means for wiping a portion of the sliver circumferentially about the wire, and means for holding the reinforcing filament and thereby the unattached portion of the sliver under tension and substantially parallel to the wire while the wiping takes place.

37. In a machine for making insulated wire, means for moving a wire in an approximately vertical direction, means for applying an adhesive to the wire, means for moving a flat strip of loose fibres having a reinforcing filament extending lengthwise thereof in a substantially vertical direction and gradually into contact with a portion of the wire, means for wiping the strip onto the wire, and means for holding the reinforcing filament and thereby the unattached portion of the strip under control so that the wiping action takes place while that portion of the strip is held substantially parallel to the wire.

38. In a machine for making insulated wire, means for moving a wire in one direction, means for moving in approximately the same direction and gradually into contact with the wire a flat sliver of fibres having an embedded longitudinal reinforcing element, means for wiping a portion of the sliver onto the wire, and means for holding the unattached portion of the sliver under control during the wiping action comprising means acting through the reinforcing element to hold it and thereby the unattached portion of the sliver in proper position for wiping as the operation progresses.

39. In a machine for making insulated wire, means for applying an adhesive to the wire, means for moving the adhesive-coated wire, means for moving in substantially the same direction and in proximity to and gradually into contact with the wire a flat sliver of fibres having an embedded longitudinal reinforcing element, means for wiping a portion of the sliver onto the wire, means for holding the unattached portion of the sliver under control comprising means acting through the reinforcing element to hold it and thereby the unattached portion of the sliver in proper position for wiping as the operation progresses, means to impregnate the wiped-on layer of fibres with a fibre-binding compound, means for subjecting said layer to a further wiping and compressing action, and means for smoothing and polishing the outer surface of said layer.

40. In apparatus for covering a conductor with a mass of entangled fibres of insulating material having a reinforcing and carrying filament embedded therein to prevent longitudinal strain thereon, means to wrap the mass of fibres transversely about the conductor, means to direct the reinforcing filament with the fibres carried thereby alongside of the conductor substantially parallel thereto and toward said fibre wrapping means, and common means to draw the conductor through said fibre wrapping means and to maintain the reinforcing filament taut to substantially prevent the mass of fibres twisting about the conductor.

41. In a machine for insulating wire, means for directing the wire downwardly in a substantially vertical direction, means for directing a flat sliver of fibres having a reinforcing filament embedded therein downwardly and substantially vertically into generally parallel and close relation to a portion of the wire, means rotating about the wire for wiping a portion of the fibres of the sliver about the wire, and means acting upon the reinforcing filament to maintain it taut to limit the tension on the sliver.

42. In a machine for insulating wire, means for directing the wire downwardly in a substantially vertical direction, means for directing a flat sliver of fibres having a reinforcing filament embedded therein downwardly and substantially vertically into generally parallel and close relation to a portion of the wire, means rotating about the wire for wiping a portion of the fibres of the sliver about the wire, and means to draw the wire through said wiping means, said last-named means acting upon the reinforcing filament to maintain it taut and thereby limit the tension on the sliver.

43. In a machine for insulating wire, the combination of means for feeding the wire, means for directing a sliver of fibres having a long filament embedded therein in substantial parallelism with the wire so that it gradually contacts with the same, a rapidly rotating wiper for applying the sliver to the wire, and means holding the filament extraneously and thus controlling the position of the sliver during the wiping operation.

JOHN W. GREENLEAF.